United States Patent
Kumar et al.

(10) Patent No.: US 11,146,500 B1
(45) Date of Patent: Oct. 12, 2021

(54) OPTIMIZED TRANSPORT RESOURCE ALLOCATION USING CENTRALIZED CONTROL POLICY

(71) Applicant: Cisco Technology, Inc., San Jose, CA (US)

(72) Inventors: Managa Sunitha Arun Kumar, Sunnyvale, CA (US); Gowri Mahendran Lingam Chandramohan, Sunnyvale, CA (US); Laxmikantha Reddy Ponnuru, Santa Clara, CA (US); Samir Thoria, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/087,966

(22) Filed: Nov. 3, 2020

(51) Int. Cl.
*G06F 9/46* (2006.01)
*G06F 15/16* (2006.01)
*G06F 15/173* (2006.01)
*H04L 12/911* (2013.01)
*H04L 12/923* (2013.01)
*H04L 12/46* (2006.01)
*H04L 12/26* (2006.01)
*H04L 12/927* (2013.01)

(52) U.S. Cl.
CPC ........ *H04L 47/781* (2013.01); *H04L 12/4633* (2013.01); *H04L 43/12* (2013.01); *H04L 47/762* (2013.01); *H04L 47/805* (2013.01)

(58) Field of Classification Search
CPC ... H04L 47/781; H04L 47/762; H04L 47/805; H04L 12/4633; H04L 43/12
USPC ........................................................ 709/226
See application file for complete search history.

(56) References Cited

U.S. PATENT DOCUMENTS

| | | | | |
|---|---|---|---|---|
| 8,160,055 B1* | 4/2012 | Nadeau | ................... | H04L 45/68 370/351 |
| 2008/0195733 A1* | 8/2008 | Detienne | ............. | H04L 12/4633 709/224 |
| 2009/0225652 A1* | 9/2009 | Vasseur | ............... | H04L 41/0677 370/225 |

(Continued)

OTHER PUBLICATIONS

"Cisco SD-WAN Design Guide," cisco.com, Jul. 2020.
"Software-Defined Networking Approaches for Link Failure Recovery: A Survey," Jehad Ali et al., May 22, 2020.

*Primary Examiner* — Ruolei Zong
(74) *Attorney, Agent, or Firm* — Baker Botts, LLP

(57) ABSTRACT

The present disclosure is directed to systems and methods for transport resource allocation using a centralized control policy, the methods including the steps of receiving node characteristics associated with a plurality of nodes; receiving a centralized policy configuration associated with at least one control policy to be applied based on a set of match conditions; identifying a one or more nodes from the plurality of nodes that satisfy, or that are associated with one or more tunnels that satisfy, the set of match conditions; and applying the at least one control policy to the one or more nodes that satisfy, or to the one or more tunnels that satisfy, the set of match conditions, wherein the at least one control policy is configured to override at least one locally-configured bidirectional forwarding detection (BFD) timer; and/or set a maximum number of tunnels for provisioning at the identified one or more nodes.

20 Claims, 4 Drawing Sheets

(56) References Cited

U.S. PATENT DOCUMENTS

| | | | |
|---|---|---|---|
| 2010/0049868 A1* | 2/2010 | Ginsberg | H04L 45/00 709/242 |
| 2012/0176914 A1* | 7/2012 | Choudhury | H04L 43/0811 370/248 |
| 2013/0250770 A1 | 9/2013 | Zou et al. | |
| 2017/0013508 A1* | 1/2017 | Pallas | H04W 76/12 |
| 2018/0109493 A1 | 4/2018 | Khan et al. | |
| 2020/0252234 A1 | 8/2020 | Ramamoorthi et al. | |
| 2020/0314022 A1* | 10/2020 | Vasseur | H04L 41/16 |

* cited by examiner

OPTIMIZED TRANSPORT RESOURCE ALLOCATION USING CENTRALIZED CONTROL POLICY

TECHNICAL FIELD

The present disclosure generally relates to transport resource allocation, and more specifically to systems and methods for optimized transport resource allocation using a centralized control policy.

BACKGROUND

In a Software-Defined Wide Access Network (SDWAN), an edge router may establish a transport link, such as an Internet Protocol Security (IPsec) tunnel, for each Transport Locator (TLOC) interface. A bidirectional forwarding detection (BFD) probe may be used to monitor the path characteristics of the transport link.

DESCRIPTION OF EXAMPLE EMBODIMENTS

Overview

Figure 1:
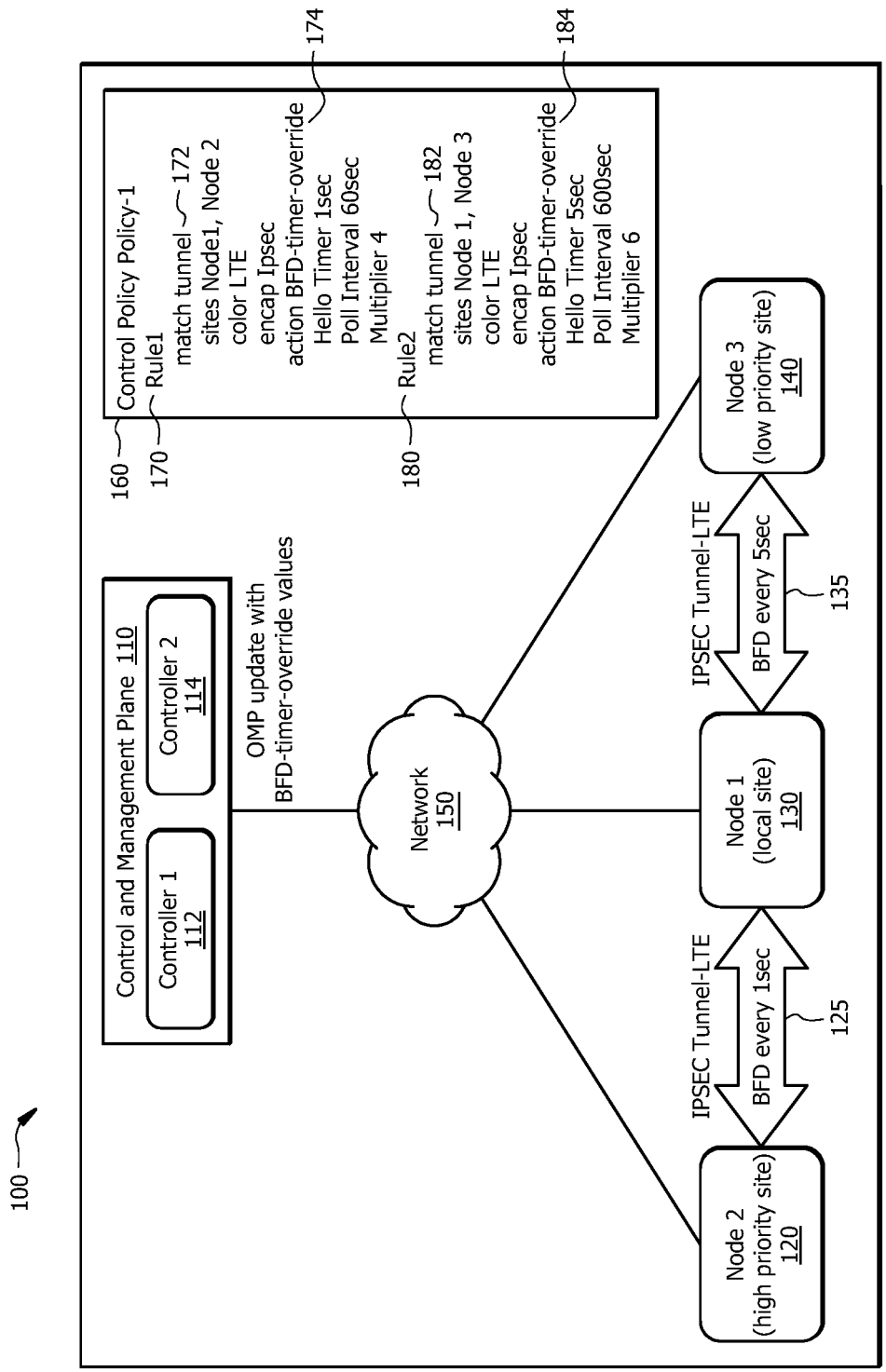
FIG. 1 illustrates a transport resource allocation system using a centralized control policy for overriding local BFD timers, in accordance with certain embodiments.

According to an embodiment, a system may include one or more processors and one or more computer-readable non-transitory storage media comprising instructions that, when executed by the one or more processors, cause one or more components of the system to perform operations including, receiving node characteristics associated with a plurality of nodes; receiving a centralized policy configuration associated with at least one control policy to be applied based on a set of match conditions; identifying one or more nodes from the plurality of nodes that satisfy, or that are associated with one or more tunnels that satisfy, the set of match conditions; and applying the at least one control policy to the one or more nodes that satisfy, or to the one or more tunnels that satisfy, the set of match conditions, wherein the at least one control policy is configured to perform at least one of the following: overriding one or more locally-configured bidirectional forwarding detection (BFD) timers with one or more centrally-configured BFD probe parameters for application to one or more BFD probes running on the one or more tunnels associated with the identified one or more nodes; or setting a maximum number of tunnels for provisioning at the identified one or more nodes.

Moreover, the set of match conditions may be associated with node characteristics, the node characteristics comprising at least one of the following: one or more site identifiers; one or more Transport Locator (TLOC) addresses; one or more TLOC domain identifiers; or one or more originator Internet Protocol (IP) addresses. Additionally, the set of match conditions may be associated with tunnel characteristics, the tunnel characteristics comprising at least one of the following: one or more tunnel colors; one or more tunnel encapsulation types; or one or more traffic carrier types.

Moreover, the at least one centrally-configured BFD probe parameter may include at least one of the following: a Hello Interval, a Poll Interval, or a Multiplier.

Additionally, the one or more nodes may be low-end edge devices in a full-mesh network.

Moreover, the operation of applying the at least one control policy to the one or more nodes or to the one or more tunnels may allow for allocation of bandwidth based on priority of the one or more nodes.

Furthermore, the at least one control policy may be applied using an overlay management protocol (OMP).

According to another embodiment, a method may include the steps of receiving node characteristics associated with a plurality of nodes; receiving a centralized policy configuration associated with at least one control policy to be applied based on a set of match conditions; identifying one or more nodes from the plurality of nodes that satisfy, or that are associated with one or more tunnels that satisfy, the set of match conditions; and applying the at least one control policy to the one or more nodes that satisfy, or to the one or more tunnels that satisfy, the set of match conditions, wherein the at least one control policy is configured to perform at least one of the following: overriding one or more locally-configured bidirectional forwarding detection (BFD) timers with one or more centrally-configured BFD probe parameters for application to one or more BFD probes running on the one or more tunnels associated with the identified one or more nodes; or setting a maximum number of tunnels for provisioning at the identified one or more nodes.

According to yet another embodiment, one or more computer-readable non-transitory storage media may embody instructions that, when executed by a processor, cause the performance of operations, including receiving node characteristics associated with a plurality of nodes; receiving a centralized policy configuration associated with at least one control policy to be applied based on a set of match conditions; identifying one or more nodes from the plurality of nodes that satisfy, or that are associated with one or more tunnels that satisfy, the set of match conditions; and applying the at least one control policy to the one or more nodes that satisfy, or to the one or more tunnels that satisfy, the set of match conditions, wherein the at least one control policy is configured to perform one or more of the following: overriding one or more locally-configured bidirectional forwarding detection (BFD) timers with one or more centrally-configured BFD probe parameters for application to one or more BFD probes running on the one or more tunnels associated with the identified one or more nodes; or setting a maximum number of tunnels for provisioning at the identified one or more nodes.

Technical advantages of certain embodiments of this disclosure may include one or more of the following. The systems and methods described herein may optimize transport resource allocation by using a centralized control policy that may dynamically override default BFD and tunnel configurations and allow for increased efficiency and intelligence-based resource allocation.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A typical SDWAN may comprise a number of sites, including, e.g., at least one data center and a plurality of remote sites. Each site may be associated with at least one edge router which may act as a gateway to facilitate the sending and receiving of data and traffic to and from other sites. For purposes of the present disclosure, each edge router may be termed a "node." The nodes may provision WAN transports, or tunnels, to transport traffic between sites. Once a tunnel is provisioned at a node, a BFD probe may be run to check the properties of the tunnel (e.g., loss, latency, jitter, etc.).

Conventionally, BFD probes are configured based on BFD timers that are local to the edge router (or node). Typical local BFD timer configurations may include the following: Hello Interval, Poll Interval, and BFD Multiplier, and/or Multiplier. A Hello Interval is the interval at which a BFD probe is sent within a tunnel. For example, a Hello Interval of 1 second means that a BFD probe is sent every 1 second. Next, a Poll Interval is the interval at which the node sending the BFD probe calculates the average loss, latency and jitter for the tunnel. Thus, if the Poll Interval is set to 60 seconds, the node will calculate the average loss, latency, and jitter of the tunnel every 60 seconds. A BFD Multiplier is a value that defines the number of BFD Hello Intervals required before declaring that the tunnel has failed. Finally, a Multiplier defines the number of Poll Intervals to be considered to calculate tunnel statistics. Thus, if the Multiplier is set to 4, after monitoring for Poll Intervals four times, an average will be calculated for loss, latency, and jitter. In a full mesh deployment, BFD probes are run in locally-configured time intervals at all edge routers (or nodes), causing high bandwidth consumption.

Additionally, in a full-mesh deployment, each node is configured to talk to every other node in the SDWAN. If a node has multiple TLOC interfaces in deployment, the node will create a high number of tunnels, e.g., IPsec tunnels or Generic Routing Encapsulation (GRE) tunnels, towards every other node. In many implementations, nodes at remote sites may be low-end or low-admission devices, i.e., having reduced processing power and memory, and will not be able to successfully create a scaled number of these tunnels in the full mesh.

To address the foregoing limitations (namely, the difficulty of a low-end node in handling locally-configured BFD probes and/or the provisioning of a high number of tunnels in a full mesh overlay design), the present disclosure proposes a centralized control policy configured to: 1) override locally-configured BFD timer settings and establish centrally-configured BFD probe parameters for BFD probes running on tunnels associated with one or more nodes identified based on match conditions; and/or 2) set a maximum number of tunnels provisioned at one or more nodes identified based on match conditions, thereby enabling low-end nodes to scale the number of BFD probes and tunnels in a full-mesh deployment.

Figure 2:
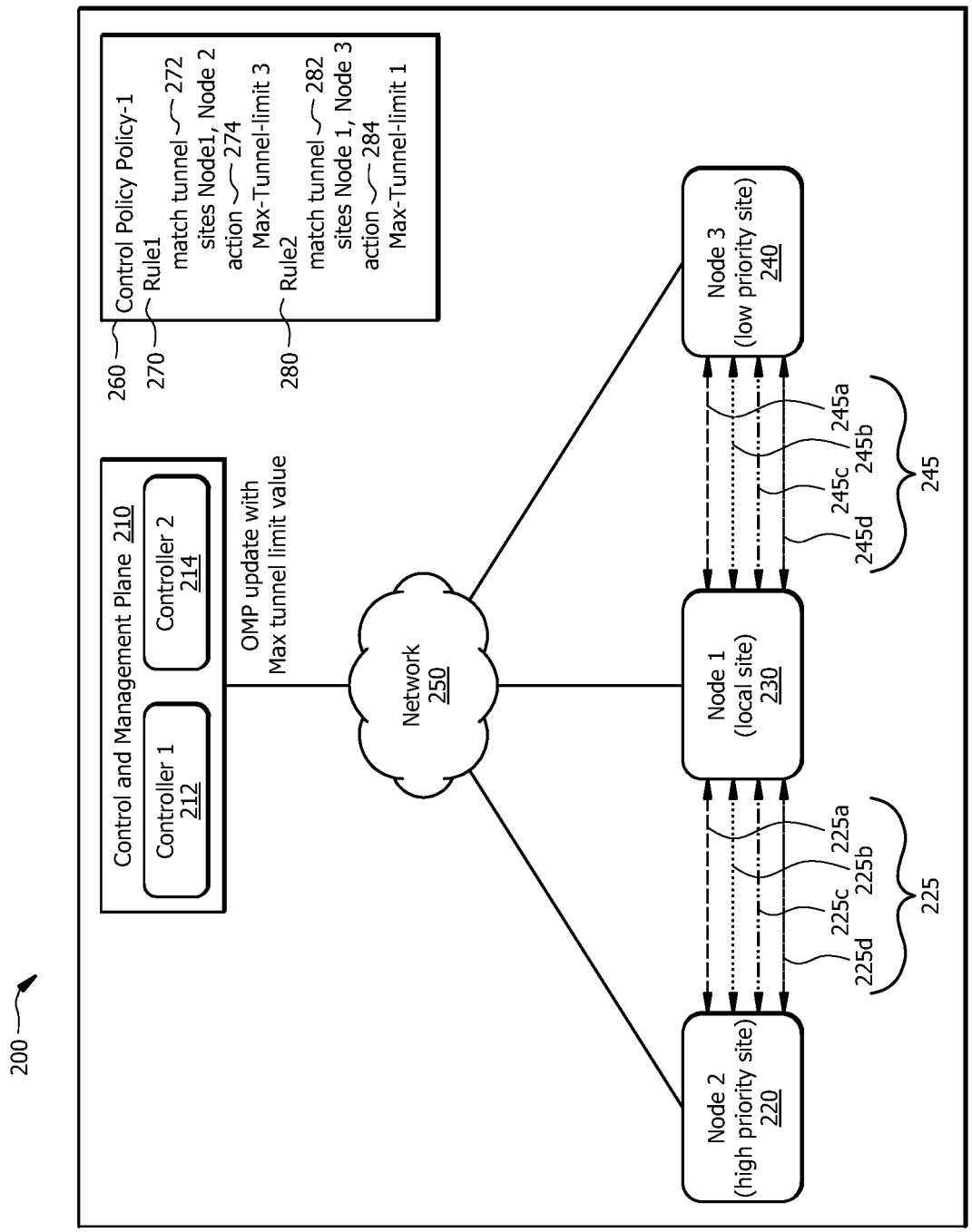
FIG. 2 illustrates a transport resource allocation system using a centralized control policy for reducing the maximum number of tunnels established, in accordance with certain embodiments.

FIGS. 1 and 2 depict systems 100 and 200 for transport resource allocation using centralized control policies, in accordance with the present disclosure. FIG. 1 depicts a transport resource allocation system 100 for overriding locally-configured BFD timers and establishing centrally-configured BFD probe parameters for BFD probes, and FIG. 2 depicts a transport allocation system 200 for setting maximum tunnel limits at nodes in a network. Although systems 100 and 200 are depicted separately in FIGS. 1 and 2, respectively, it is to be understood that the functionality depicted in systems 100 and 200 may be combined into a single system. Additionally, it is to be understood that while FIGS. 1 and 2 depict different functionality, the general architectures of systems 100 and 200 may be the same or substantially similar.

Reference is now made to system 100 of FIG. 1. System 100 may include a control and management plane 110 having at least one central controller, e.g., a first central controller 112 (labeled "Controller 1" in FIG. 1), for coordinating centralized management of system 100. It is to be understood that the control and management plane 110 may have any number of central controllers, e.g., a second central controller 114 (labeled "Controller 2") is also shown in FIG. 1. The first and second central controllers 112, 114 may each comprise a control module for, inter alia, running an overlay management protocol (OMP). In SDWAN, OMP is the control protocol used to exchange routing, policy, and management information between the central controllers 112, 114 and nodes 120, 130, 140, as well as to establish and maintain the control plane, including by orchestrating overlay network communication and connectivity between network nodes.

System 100 may further include one or more edge routers, also referred to as "nodes", e.g., Node 1 130, Node 2 120, and Node 3 140 (collectively referred to as a "plurality of nodes"). In a full mesh deployment, system 100 may include hundreds or thousands of nodes. The plurality of nodes 120, 130, 140 may be located at remote sites located throughout the network. For example, in an enterprise network, the plurality of nodes 120, 130, 140 may comprise branch sites located in various cities across a region or a country. For purpose of illustration, FIG. 1 shows Node 1 130 as a local site, Node 2 120 as a high priority site, and Node 3 140 as a low priority site. By way of example, a headquarters site may be designated as a high priority site, and a branch office may be a low priority site. By default, the BFD timer(s) on each of the plurality of nodes 120, 130, 140 may be locally configured as follows: Hello Interval at 1 second; Poll Interval at 120 seconds; and Multiplier at 6.

Each of the plurality of nodes 120, 130, 140 may communicate with and transmit information to at least one central controller 112 via a network connection, such as the Internet 150. Specifically, when a given node (e.g., Node 1 130) of the plurality of nodes 120, 130, 140 is set up in a remote site, it may establish a connection with at least one central controller 112. Where there are multiple central controllers 112, 114, the node 130 may establish a connection with each of the multiple central controllers 112, 114. Once a connection is established between the node 130 and at least one controller 112, the node 130 may transmit its node characteristics to the controller 112. Node characteristics may include characteristics associated with the node itself and/or characteristics of one or more tunnels associated with the node. Node characteristics may include, but are not limited to, information relating to the interfaces, transport links, LAN links, etc. associated with the node 130. The controller 112 may store the node characteristics in a memory or local database (not shown). Likewise, any changes made to the node characteristics may be transmitted to the controller and stored in the local database. In this manner, the controller 112 will receive and store node characteristics associated with each of the plurality of nodes 120, 130, 140 in the network. In an embodiment, the controller 112 may function as a route reflector, which means that after it receives and/or learns the node characteristics (including any changes or updates to node characteristics) associated with the node 130, it may reflect or share that information with all the other nodes 120, 140 in the network via OMP. Thus, the node characteristics associated with the plurality of nodes 120, 130, 140 in the network may be reflected or shared with all other nodes in the network.

Because the node characteristics of the plurality of nodes 120, 130, 140 are known by the controller 112, one or more policies may be created by a user (or generated by a network device) and received on the controller 112 and applied to applicable nodes. Specifically, the controller 112 may receive from a user or a network device a centralized policy configuration associated with at least one control policy (or associated with more than one control policy) to be applied to one or more of the plurality of nodes 120, 130, 140 based on a set of match conditions, wherein a "set" is defined as one or more. Match conditions may be associated with node characteristics, which as described above may include characteristics relating to the nodes and/or characteristics relating to the tunnels provisioned at the nodes. For example, match conditions relating to characteristics of nodes may include the one or more of the following: one or more site identifiers (e.g., identifying a given site); one or more TLOC addresses (e.g., a three-tuple of IP address, color, and encapsulation); one or more domain identifiers associated with a TLOC (e.g., identifying the overlay network domain); and/or one or more originator Internet Protocol (IP) addresses (e.g., a numeric identifier that represents the address of an originating device). The match conditions relating to characteristics of tunnels provisioned at the nodes may include one or more of the following: one or more tunnel colors (e.g., identifying TLOC type, such as Long-Term Evolution (LTE), 3G, public-internet); one or more tunnel encapsulation types (e.g., IPsec or GRE); and/or one or more traffic carrier types (e.g., identifying the carrier type, such as public or private). It is to be understood that the match conditions of the present disclosure are not to be limited to the foregoing list of characteristics, and may be based on any additional characteristics known or discovered in the art.

Once a centralized policy configuration associated with at least one control policy having a set of defined match conditions is received, the controller 112 may identify one or more nodes from the plurality of nodes 120, 130, 140 that satisfy the set of match conditions, or one or more nodes from the plurality of nodes 120, 130, 140 that are associated with tunnels that satisfy the set of match conditions. Since the set of match conditions may be based on node characteristics (which may include characteristics of the nodes and/or characteristics of the tunnels), nodes and/or tunnels may satisfy the match conditions. If the latter, the controller may identify the nodes associated with tunnels that satisfy the match conditions. The controller may then apply the control policy, e.g., a specified action, to the one or more nodes, or to the one or more tunnels associated with the one or more nodes, that satisfy the set of match conditions.

Continued reference is made to FIG. 1, wherein is shown an example control policy 160 that may be applied to the one or more nodes 120, 130, 140 (or to the one or more tunnels 125, 135 associated with the one or more nodes). Control policy 160 may be defined by one or more rules 170, 180 having associated match conditions and actions. For example, a first rule 170 may be associated with a first set of match conditions 172. Specifically, as shown in FIG. 1, the first set of match conditions 172 of the first rule 170 may include particular site identifiers (e.g., Node1, Node2), a particular tunnel color (e.g., LTE), and a tunnel encapsulation type (e.g., IPsec). Likewise, a second rule 180 may be associated with a second set of match conditions 182. Specifically, the second set of match conditions 182 of the second rule 180 may include particular site identifiers (e.g., Node1, Node3), a particular tunnel color (e.g., LTE), and a tunnel encapsulation type (e.g., IPsec). It is to be understood that the first set of match conditions 172 of the first rule 170 and the second set of match conditions 182 of the second rule 180 are shown for purposes of illustration only, and may include any number or type of match conditions and combinations thereof.

The first rule 170 of the control policy 160 may further be defined by a first action (or set of actions) 174 which may be taken if the first set of match conditions 172 are satisfied. Similarly, the second rule 180 of the control policy 160 may further be defined by a second action (or set of actions) 184 which may be taken if the second set of match conditions 182 are satisfied. Specifically, a first action 174 may include overriding the locally-configured BFD timers on BFD probes that are to be run on tunnel(s) provisioned between the nodes identified by the first set of match conditions 172, namely tunnel 125 between Node 1 130 and Node 2 120, and centrally configuring BFD probe parameters for application to the BFD probes that are to be run on tunnel 125. Specifically, as shown in the first action 174, the centrally-configured BFD probe parameters may include setting the Hello Interval to 1 second, the Poll Interval to 60 seconds, and the Multiplier to 4. It is to be understood that the specific probe parameters in FIG. 1 are shown for purposes of illustration only, and that probe parameters may be set to any desired values. In this case, because Node 2 120 is a critical, high-priority node, the centrally configured probe parameters of the first action 174 of the control policy 160 may enable BFD probes to be sent and loss, latency, and jitter measurements to be taken more frequently, as would be desired for a high-priority node, than is permitted under the default, locally-configured settings.

Likewise, the second action 184 may include overriding the locally-configured BFD timers on BFD probes that are to be run on tunnel(s) provisioned between the nodes identified by the second set of match conditions 182, namely tunnel 135 running between Node 1 130 and Node 3 140, and centrally configuring BFD probe parameters for application to the BFD probes that are to be run on tunnel 135. Specifically, the second action 184 shows centrally-configured BFD probe parameters include setting the Hello Interval to 5 seconds, the Poll Interval to 600 seconds, and the Multiplier to 6. In this example, because Node 3 140 is a less-critical, low-priority node, the centrally configured probe parameters may enable BFD probes to be sent and loss, latency, and jitter measurements to be taken less frequently, as would be desired for a low-priority node, than permitted under the default, locally-configured settings. This may allow for the reducing of CPU utilization and memory consumption, which helps in reserving valuable bandwidth for higher priority traffic. The control policy 160, including the corresponding rules 170, 180 and associated match conditions 172, 182, respectively, are evaluated in the controller 112, and if a match is identified between the node characteristics listed in the match conditions 172, 182 and the node characteristics of one or more nodes in the network (and/or of tunnels associated with one or more nodes), the controller 112 may apply the control policy to the identified nodes and/or tunnels by overriding BFD timer values via OMP.

Although the control policy 160 in the example of FIG. 1 depicts match conditions identifying site identifiers corresponding to particular nodes (e.g., two nodes for both the first and second rules 170, 180), the disclosure is not to be limited in this way. In an embodiment, specific site identifiers need not be identified, and match conditions may correspond to broad characteristics which may apply to any number of nodes and/or tunnels. Once the controller identifies the one or more nodes and/or one or more tunnels that satisfy the match conditions, the controller may apply the action defined by the control policy to the identified nodes and/or tunnels via OMP.

Reference is now made to FIG. 2, wherein is shown a transport resource allocation system 200 using a centralized control policy for reducing the maximum number of tunnels established at or between one or more nodes. In an embodiment, the elements of system 200 of FIG. 2 may mirror the elements of system 100 of FIG. 1. Specifically, system 200 may include a control and management plane 210 having a central controller, e.g., a first central controller 212 (labeled "Controller 1" in FIG. 2), for coordinating centralized management of system 200. The control and management plane 210 may have any number of central controllers, e.g., a second central controller 214 (labeled "Controller 2") is also shown in FIG. 2. The first and second central controllers 212, 214 may each comprise a control module for, inter alia, running an OMP.

System 200 may further include one or more edge routers, also referred to as nodes, e.g., Node 1 230, Node 2 220, and Node 3 240 (collectively referred to as a "plurality of nodes"). The plurality of nodes 220, 230, 240 may be located at remote sites located throughout the network. For purpose of illustration, FIG. 2 shows Node 1 230 as a local site, Node 2 220 as a high priority site, and Node 3 240 as a low priority site. Tunnels, such as IPsec tunnels or GRE tunnels, may be provisioned at one or more of the plurality of nodes 220, 230, 240. These tunnels may be created per TLOC interface. A TLOC interface may refer to a link, e.g., Comcast® link, Verizon® link, AT&T® link, and the like. Therefore, if a given node has three TLOC interfaces, and the default local configuration is to provision three active tunnels per TLOC interface, a total of nine active tunnels may be provisioned between the given node and any other node in the network. In a full-mesh network having 1000 sites, each node may create approximately 9000 tunnels by default, thereby overburdening low-end devices by inordinate bandwidth consumption.

As further illustrated in FIG. 2, a set of available tunnels (collectively, tunnels 225) may be available between Node 1 230 and Node 2 220. In particular, four available tunnels 225a-d are shown between Node 1 230 and Node 2 220. Likewise, a set of available tunnels (collectively, tunnels 245) corresponding to four available tunnels 245a-d are shown between Node 1 230 and Node 3 240. The default configuration may be to provision all available tunnels 225a-d between Node 1 230 and Node 2 220, and all available tunnels 245a-d between Node 1 230 and Node 3 240. However, depending on the priority of a given node and the amount of traffic flow, all available tunnels may not be needed and provisioning all available tunnels may be a waste of resources.

As described above and illustrated in FIG. 2, the present disclosure is directed to the establishment of a centralized control policy in which OMP may be invoked to set a maximum number of tunnels at or between one or more nodes. In other words, a user may create a centralized policy configuration associated with a control policy 260 that limits the number of tunnels that may be provisioned at or between an identified node or set of nodes. In an embodiment, the control policy 260 may be defined by one or more rules 270, 280 having associated match conditions and actions. For example, a first rule 270 may be associated with a first set of match conditions 272 and a corresponding first action (or set of actions) 274. As described above in conjunction with FIG. 1, match conditions may be associated with node characteristics, i.e. characteristics relating to the nodes and/or characteristics relating to the tunnels provisioned at the nodes, and may include (but are not limited to) any of the characteristics described in conjunction with system 100 above. The corresponding action to be taken may include setting a maximum number of tunnels (i.e., a maximum tunnel limit) to be provisioned between the nodes which satisfy the match conditions. By way of example, in the control policy 260 shown in FIG. 2, the first set of match conditions 272 of the first rule 270 includes particular site identifiers (e.g., Node1, Node2), and the first action 274 is defined to set a maximum tunnel limit of three tunnels at or between nodes that satisfy the first set of match conditions 272. Likewise, a second rule 280 may be associated with a second set of match conditions 282 and a corresponding second action (or set of actions) 284. The second set of match conditions 282 includes particular site identifiers (e.g., Node1, Node3), and the second action 284 is defined to set a maximum tunnel limit of one tunnel at or between nodes that satisfy the second set of match conditions 282. It is to be understood that the match conditions 272, 282 of the first rule 270 and the second rule 280, respectively, are shown for purposes of illustration only, and may include any number or type of match conditions or combinations thereof. Additionally, it is to be understood that the control policy 260 is not limited to first and second rules 270, 280 and may include any number of rules.

In accordance with the control policy 260, the first action 274 may be taken on nodes and/or tunnels which satisfy the first set of match conditions 272. Here, the first set of match conditions 272 are associated with site identifiers "Node1" and "Node2." Thus, for nodes which correspond to those site identifiers, i.e., Node 1 230 and Node 2 220, the first action 274—setting the maximum tunnel limit to three tunnels—may be applied between Node 1 230 and Node 2 220. Thus, the default tunnel configuration which provisions all four available tunnels between Node 1 230 and Node 2 220 may be dynamically overridden by the control policy 260 and a maximum tunnel limit of three tunnels may be set by the controller 212 via OMP, regardless of the number of TLOC interfaces deployed between Node 1 230 and Node 2 220. In an embodiment, if the match conditions refer to characteristics relating to tunnels provisioned at the nodes, the controller may identify the nodes that are associated with tunnels that satisfy the match conditions, and the configured maximum tunnel limit may be applied to tunnels provisioned between the identified nodes.

Similarly, the second action 284 may be taken on nodes and/or tunnels which satisfy the second set of match conditions 282. Here, the second set of match conditions 282 lists site identifiers "Node1" and "Node3." Therefore, for nodes which correspond to those site identifiers, i.e., Node 1 230 and Node 3 240, the second action of setting the maximum tunnel limit to one tunnel may be applied. Hence, the default tunnel configuration for the provisioning all four available tunnels may be overridden and a maximum tunnel limit of one may be set by the controller 212 via OMP, regardless of the number of TLOC interfaces deployed between Node 1 230 and Node 3 240.

In an embodiment, the maximum tunnel limit is per pair of nodes. In the example of FIG. 2, two nodes were identified based on the application of the match conditions in each of the first and second rules 270, 280. As a result the maximum tunnel limit was set between the identified pair of nodes, i.e., between Node 1 230 and Node 2 220 for the first rule 270, and between Node 1 230 and Node 3 240 for the second rule 280. If three nodes are identified based on application of the match conditions, e.g., Node 1, Node 2, and Node 3, the maximum tunnel limit would be set between each combination of pairs of nodes. In other words, the configured maximum tunnel limit would be set between Node 1 and Node 2, between Node 2 and Node 3, and between Node 1 and Node 3. If one node is identified based on application of the match conditions, e.g., Node 1, the maximum tunnel limit would be applied between the identified node, Node 1, and every other node in the full mesh network. As such, when the present disclosure describes that the setting of a maximum tunnel limit may result in the provisioning of a maximum number of tunnels "at" one or more identified nodes, this language may include maximum tunnels provisioned "at" an identified node (such as in the case of a singly identified node, wherein the maximum tunnel limit would be applied to tunnels between the identified node and every other node in the network), as well as maximum tunnels provisioned "between" identified nodes (such as in the case of multiple identified nodes, wherein the maximum tunnel limit would be applied to tunnels between/ among the identified nodes).

In an embodiment, the first and second actions 274, 284 may be defined based on various parameters or conditions associated with the nodes and/or tunnels, such as the amount and type of traffic at or between the nodes, the nature of a given node (high priority vs. low priority), constraints on the availability of CPU/memory at the nodes, etc. The ability to dynamically override default tunnel configurations allows for reduced CPU utilization and memory consumption and reservation of valuable bandwidth for higher priority sites/ traffic. High priority and critical nodes may be allowed to provision more tunnels and be allocated more bandwidth than low priority nodes having minimal or less-critical traffic. The result is a more efficient system that allows for intelligent allocation of transport resources based on real-time usage.

While the present disclosure describes the operations associated with systems 100 and 200 separately in FIGS. 1 and 2, it is to be understood that the centralized policy configurations and control policies (including the various elements thereof) of systems 100 and 200 may be combined. Specifically, the actions associated with the control policy described in FIG. 1 (e.g., overriding locally-configured BFD timers and centrally configuring BFD probe parameters for application to the BFD probes that are to be run on the tunnels associated with nodes identified based on match conditions,) and FIG. 2 (e.g., setting a maximum number of tunnels to be provisioned between the nodes which satisfy the match conditions) may be applied alone as separate policies or in combination as part of a single control policy. In other words, the centralized policy configuration received by the controller 112, 212 may include the control policies described in FIG. 1, or the control policies described in FIG. 2, or a combination of the control policies described in FIGS. 1 and 2.

Figure 3:
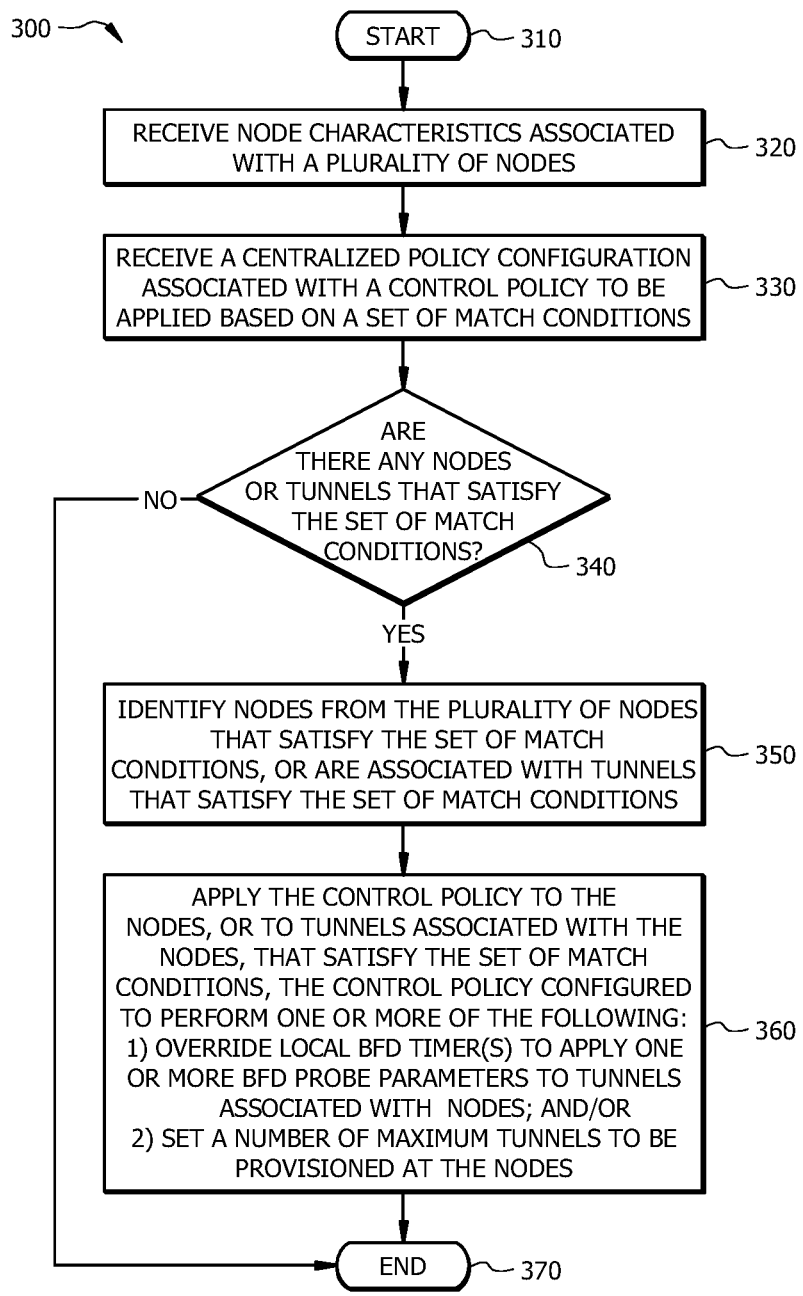
FIG. 3 illustrates a flow diagram of a method for transport resource allocation, in accordance with certain embodiments.

Reference is now made to FIG. 3, wherein is shown a flow diagram of a method 300 for transport resource allocation, in accordance with the present disclosure. The steps of method 300 may be in accord with the operations outlined in conjunction with the systems 100 and 200 of FIGS. 1 and 2. As such, similar and corresponding terms described in conjunction with FIGS. 1 and 2 may have the same meaning when used in conjunction with method 300 of FIG. 3. Additionally, the present disclosure incorporates by reference the descriptions of the transport resource allocation systems 100 and 200 for the purposes of explaining, expounding upon, or otherwise clarifying the steps of method 300.

Method 300 may be performed in a full-mesh network having at least one central controller and a plurality of edge routers or nodes. In an embodiment, a central controller may be configured in a control and management plane of a network and may coordinate central management of the plurality of nodes in the network. In an embodiment, the central controller may include a control module for running OMP. In an embodiment, the steps of method 300 may be performed from the perspective of a central controller. However, it is to be understood that method 300 may be performed by any component, element, or module in a network without departing from the spirit or scope of the present disclosure.

The plurality of nodes may be located at remote sites located throughout the network. For example, in an enterprise network, the plurality of nodes may reside in branch sites located in various cities across a region or a country. In an embodiment, a node may correspond to a high priority site, or a low priority site. In an embodiment, at least some of the plurality of nodes may be low-end, or low-admission, edge devices, i.e., having reduced processing power and memory, and therefore limited in its ability to manage a large volume of tunnels and BFD probes.

Tunnels, such as IPsec tunnels or GRE tunnels, may be provisioned at a node, between a pair of nodes, or between one or more pairs of nodes of a plurality of nodes. Once a tunnel is provisioned at or between nodes, BFD probes may be run to check the properties of the tunnel (e.g., loss, latency, jitter, etc.). Conventionally, the BFD probes are configured based on BFD timers that are local to the node. In a full mesh deployment, BFD probes are sent in time intervals that are, by default, locally configured to each node. The local BFD timers may include various parameters, including Hello Interval, Poll Interval, BFD Multiplier, and/or Multiplier, as described above in conjunction with FIG. 1.

Additionally, the tunnels which are provisioned between nodes may be created per TLOC interface. Therefore, if each node in a given pair of nodes has three TLOC interfaces, and the default local configuration is to provision three active tunnels per TLOC interface, a total of nine active tunnels may be provisioned be the pair of nodes. If a full-mesh network includes 1000 sites, each node may create approximately 9000 tunnels by default.

The method 300 of FIG. 3 will now be described. The method 300 may begin at step 310. At step 320, the central controller in a control and management plane may receive node characteristics associated with a plurality of nodes. Specifically, when a given node is first set up in a remote site, the node may establish a connection with the central controller, and may transmit node characteristics to the central controller. Node characteristics may include characteristics associated with the node itself and/or characteristics of one or more tunnels associated with the node. Node characteristics may include, but are not limited to, information relating to the interfaces, transport links, LAN link, etc. of the node. Where there are multiple central controllers, the node may establish a connection with and transmit its node characteristics to each of the multiple central controllers. The controller may store the node characteristics in a memory or local database. Any changes made to the node characteristics may also be transmitted to the controller and stored in the local database. In this manner, the controller may receive and store node characteristics associated with each of the plurality of nodes of the network. In an embodiment, the central controller may function as a route reflector, which means that after it receives and/or learns the node characteristics or any updates to the node characteristics associated with a given node, it may reflect or share that information with all the other nodes in the network. Thus, the node characteristics of the plurality of nodes in the network may be reflected or shared with all other nodes in the network.

At step 330, the central controller may receive a centralized policy configuration associated with at least one control policy to be applied based on a set of match conditions. In other words, the control policy may include a set of match conditions and may be associated with at least one policy or action to be taken if the match conditions are satisfied. In an embodiment, the centralized policy configuration may be received from a user. In another embodiment, the centralized policy configuration may be received from another network device. The "set" of match conditions may include one or more match conditions.

Match conditions may be based on node characteristics, i.e. characteristics relating to the nodes and/or characteristics relating to tunnels provisioned at or between nodes. For example, match conditions relating to characteristics of nodes may include the one or more of the following (including any combination of the following): one or more site identifiers; one or more TLOC addresses; one or more TLOC domain identifiers; and/or one or more originator IP addresses. Match conditions relating to characteristics of tunnels provisioned at or between nodes may include one or more of the following (including any combination of the following): one or more tunnel colors; one or more tunnel encapsulation types; and/or one or more traffic carrier types. It is to be understood that the match conditions of the present disclosure are not to be limited to the foregoing lists of attributes, and may be based on any additional attributes known or discovered in the art.

At step 340, a determination is made by the central controller as to whether there are one or more nodes from the plurality of nodes that satisfy the set of match conditions, or one or more nodes associated with one or more tunnels that satisfy the set of match conditions. If, at step 340, it is determined that there are not one or more nodes or one or more tunnels that satisfy the set of match conditions, the method will end at step 370. If, however, at step 340, it is determined that there are one or more nodes from the plurality of nodes that satisfy the set of match conditions, or that there are one or more nodes associated with one or more tunnels that satisfy the set of match conditions, the method will proceed to step 350.

At step 350, the controller may identify the one or more nodes from the plurality of nodes that satisfy the defined match conditions, or the one or more nodes that are associated with one or more tunnels that satisfy the set of match conditions.

At step 360, the controller may apply the at least one central control policy, e.g., a specified action or set of actions, to the one or more nodes that satisfy, or to the one or more tunnels associated with the one or more nodes that satisfy, the set of match conditions. As described in conjunction with FIGS. 1 and 2, at least one the following control policies or actions may be taken if match conditions are satisfied: 1) invoking OMP to override locally-configured BFD timers with one or more centrally-configured BFD probe parameters for application to one or more BFD probes run on the one or more tunnels associated with the identified one or more nodes; and/or 2) invoking OMP to set a maximum number of tunnels for provisioning at the identified one or more nodes. It is to be understood that either or both control policies may be applied at any given time by the central controller based on the centralized policy configuration. Each of the central control policies will be described in turn.

With respect to the first control policy described above (namely, wherein OMP may be used to override local BFD timer configurations and apply one or more centrally-configured BFD probe parameters), the control policy may be defined by one or more rules, wherein each rule is defined by a set of match conditions (the set comprising one or more match conditions) and a set of corresponding actions (the set comprising one or more actions). By way of example, a rule may be associated with a set of match conditions which may comprise at least one (and may include more than one) of the following: one or more site identifiers, one or more tunnel colors, and/or a tunnel encapsulation type. It is to be understood that the match conditions of the rule are described for purposes of illustration only, and may include any number or type of match condition or combinations thereof. The rule may further be defined by a corresponding action which may be taken if the set of match conditions are satisfied. By way of example, an action may include overriding the locally-configured BFD timers and setting the Hello Interval, the Poll Interval, the BFD Multiplier and/or the Multiplier to specific values. For nodes that are critical and high-priority, it may be beneficial to update these parameters such that BFD probes are run and loss, latency, and jitter measurements are taken frequently. For nodes that are not critical and/or low-priority, it may be beneficial to update these parameters such that BFD probes are run and loss, latency, and jitter measurements are taken less frequently, as this allows for reservation of bandwidth for higher priority traffic.

With respect to the second control policy described above (namely, invoking OMP to set a maximum number of tunnels (i.e., a maximum tunnel limit) for provisioning at the identified one or more nodes), the control policy may similarly be defined by one or more rules, wherein each rule is defined by a set of match conditions (comprising one or more match conditions) and a set of corresponding actions (comprising one or more actions). For example, a rule may be associated with a set of match conditions comprising one or more site identifiers. Site identifiers may be selected based on traffic volume, the nature or type of the sites (e.g., high-priority, low-priority), and any number of other considerations. The rule may further be defined by a corresponding action which may be taken if the set of match conditions are satisfied. By way of example, an action may include increasing the maximum tunnel limit (e.g., above the default value) at critical, high-priority nodes, or decreasing the maximum tunnel limit (e.g., below the default value) at less critical, low-priority nodes. Hence, the default tunnel configuration which may provision a set number of tunnels regardless of the condition of the corresponding sites may be overridden and a maximum tunnel limit may be set. In an embodiment, a maximum tunnel limit may be set regardless of the number of TLOC interfaces deployed at the one or more nodes. Additionally, the application of control policies, as described above, to the one or more nodes or to the one or more tunnels associated with the one or more nodes allows for allocation of bandwidth based on priority of the one or more nodes. High priority and critical nodes may be allowed to provision more tunnels and be allocated more bandwidth than low priority nodes having minimal or less-critical traffic. The result is a more efficient system that allocates transport resources based on real-time usage.

It is to be understood that the centralized policy configuration of the present disclosure, and the control policy that is applied at the identified nodes which satisfy the match conditions, or are associated with tunnels that satisfy the match conditions, may include either/both of the control policies described above. Specifically, the controller may apply a control policy corresponding to the first control policy (e.g., overriding locally-configured BFD timers and centrally configuring BFD probe parameters for application to the BFD probes that are to be run on the tunnels associated with nodes identified based on match conditions) or the second control policy (e.g., setting a maximum number of tunnels to be provisioned between the nodes which satisfy the match conditions), or a combination of the first and second control policies.

At step 370, the method may end.

In sum, the systems and methods of the present disclosure may allow for dynamic and optimized transport resource allocation using a centralized control policy. The ability to dynamically override default tunnel configurations allows for increased efficiency and intelligence-based resource allocation.

Figure 4:
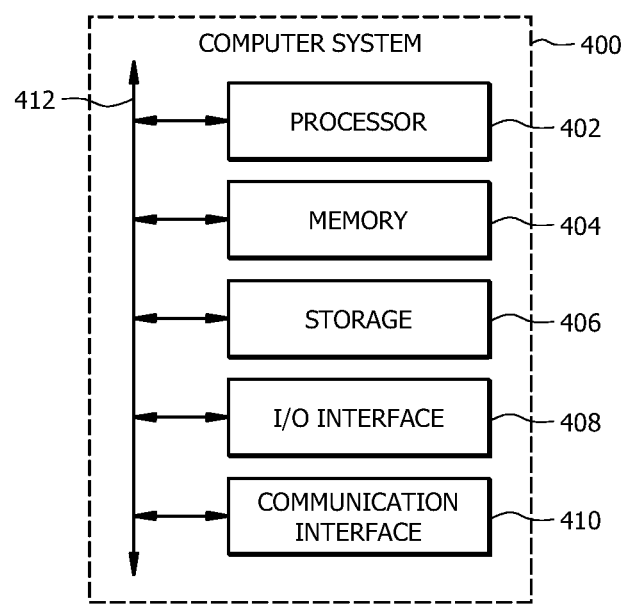
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   receiving node characteristics associated with a plurality of nodes;
   receiving a centralized policy configuration associated with at least one control policy to be applied based on a set of match conditions;
   identifying one or more nodes from the plurality of nodes that satisfy, or that are associated with one or more tunnels that satisfy, the set of match conditions; and
   applying the at least one control policy to the one or more nodes that satisfy, or to the one or more tunnels that satisfy, the set of match conditions, wherein the at least one control policy is configured to perform at least one of the following:
   overriding one or more locally-configured bidirectional forwarding detection (BFD) timers with one or more centrally-configured BFD probe parameters for application on one or more BFD probes running on the one or more tunnels associated with the identified one or more nodes; or
   setting a maximum number of tunnels for provisioning at the identified one or more nodes.

2. The system of claim 1, wherein the set of match conditions are associated with node characteristics, the node characteristics comprising at least one of the following: one or more site identifiers; one or more Transport Locator (TLOC) addresses; one or more TLOC domain identifiers; or one or more originator Internet Protocol (IP) addresses.

3. The system of claim 1, wherein the set of match conditions are associated with tunnel characteristics, the tunnel characteristics comprising at least one of the following: one or more tunnel colors; one or more tunnel encapsulation types; or one or more traffic carrier types.

4. The system of claim 1, wherein the one or more centrally-configured BFD probe parameters comprise at least one of the following: a Hello Interval, a Poll Interval, or a Multiplier.

5. The system of claim 1, wherein the one or more nodes are low-end edge devices in a full-mesh network.

6. The system of claim 1, wherein the step of applying the at least one control policy to the one or more nodes or to the one or more tunnels allows for allocation of bandwidth based on priority of the one or more nodes.

7. The system of claim 1, wherein the at least one control policy is applied using an overlay management protocol (OMP).

8. A method, comprising:
   receiving node characteristics associated with a plurality of nodes;
   receiving a centralized policy configuration associated with at least one control policy to be applied based on a set of match conditions;
   identifying one or more nodes from the plurality of nodes that satisfy, or that are associated with one or more tunnels that satisfy, the set of match conditions; and
   applying the at least one control policy to the one or more nodes that satisfy, or to the one or more tunnels that satisfy, the set of match conditions, wherein the at least one control policy is configured to perform at least one of the following:
   overriding one or more locally-configured bidirectional forwarding detection (BFD) timers with one or more centrally-configured BFD probe parameters for application on one or more BFD probes running on the one or more tunnels associated with the identified one or more nodes; or
   setting a maximum number of tunnels for provisioning at the identified one or more nodes.

9. The method of claim 8, wherein the set of match conditions are associated with node characteristics, the node characteristics comprising at least one of the following: one or more site identifiers; one or more Transport Locator (TLOC) addresses; one or more TLOC domain identifiers; or one or more originator Internet Protocol (IP) addresses.

10. The method of claim 8, wherein the set of match conditions are associated with tunnel characteristics, the tunnel characteristics comprising at least one of the following: one or more tunnel colors; one or more tunnel encapsulation types; or one or more traffic carrier types.

11. The method of claim 8, wherein the one or more centrally-configured BFD probe parameters comprise at least one of the following: a Hello Interval, a Poll Interval, or a Multiplier.

12. The method of claim 8, wherein the one or more nodes are low-end edge devices in a full-mesh network.

13. The method of claim 8, wherein the step of applying the at least one control policy to the one or more nodes or to the one or more tunnels allows for allocation of bandwidth based on priority of the one or more nodes.

14. The method of claim 8, wherein the at least one control policy is applied using an overlay management protocol (OMP).

15. One or more computer-readable non-transitory storage media embodying instructions that, when executed by a processor, cause performance of operations comprising:
   receiving node characteristics associated with a plurality of nodes;
   receiving a centralized policy configuration associated with at least one control policy to be applied based on a set of match conditions;
   identifying one or more nodes from the plurality of nodes that satisfy, or that are associated with one or more tunnels that satisfy, the set of match conditions; and
   applying the at least one control policy to the one or more nodes that satisfy, or to the one or more tunnels that satisfy, the set of match conditions, wherein the at least one control policy is configured to perform at least one of the following:
   overriding one or more locally-configured bidirectional forwarding detection (BFD) timers with one or more centrally-configured BFD probe parameters for application on one or more BFD probes running on the one or more tunnels associated with the identified one or more nodes; or
   setting a maximum number of tunnels for provisioning at the identified one or more nodes.

16. The one or more computer-readable non-transitory storage media of claim 15, wherein the set of match conditions are associated with node characteristics, the node characteristics comprising at least one of the following: one or more site identifiers; one or more Transport Locator (TLOC) addresses; one or more TLOC domain identifiers; or one or more originator Internet Protocol (IP) addresses.

17. The one or more computer-readable non-transitory storage media of claim 15, wherein the set of match conditions are associated with tunnel characteristics, the tunnel characteristics comprising at least one of the following: one or more tunnel colors; one or more tunnel encapsulation types; or one or more traffic carrier types.

18. The one or more computer-readable non-transitory storage media of claim 15, wherein the one or more centrally-configured BFD probe parameters comprise at least one of the following: a Hello Interval, a Poll Interval, or a Multiplier.

19. The one or more computer-readable non-transitory storage media of claim 15, wherein the one or more nodes are low-end edge devices in a full-mesh network.

20. The one or more computer-readable non-transitory storage media of claim 15, wherein the step of applying the at least one control policy to the one or more nodes or to the one or more tunnels allows for allocation of bandwidth based on priority of the one or more nodes.

* * * * *